(12) United States Patent
Takemura et al.

(10) Patent No.: US 9,291,838 B2
(45) Date of Patent: Mar. 22, 2016

(54) OPTICAL WAVEGUIDE ELEMENT

(71) Applicant: SUMITOMO OSAKA CEMENT CO., LTD., Chiyoda-Ku, Tokyo (JP)

(72) Inventors: Motohiro Takemura, Tokyo (JP);
Masanao Kurihara, Tokyo (JP);
Tetsuya Fujino, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/389,416

(22) PCT Filed: Mar. 29, 2013

(86) PCT No.: PCT/JP2013/059479
§ 371 (c)(1),
(2) Date: Sep. 30, 2014

(87) PCT Pub. No.: WO2013/147129
PCT Pub. Date: Oct. 3, 2013

(65) Prior Publication Data
US 2015/0078701 A1    Mar. 19, 2015

(30) Foreign Application Priority Data
Mar. 30, 2012    (JP) .................................. 2012-080444

(51) Int. Cl.
*G02F 1/035* (2006.01)
*G02F 1/03* (2006.01)

(52) U.S. Cl.
CPC .............. *G02F 1/035* (2013.01); *G02F 1/0356* (2013.01); *G02F 1/0305* (2013.01); *G02F 2201/07* (2013.01); *G02F 2202/22* (2013.01); *G02F 2203/21* (2013.01)

(58) Field of Classification Search
CPC ..... G02F 1/035; G02F 1/0356; G02F 1/0305; G02F 2201/07; G02F 2202/22; G02F 2203/21
See application file for complete search history.

(56) References Cited

U.S. PATENT DOCUMENTS

| 4,546,244 | A | * | 10/1985 | Miller ........................ 250/214 R |
| 4,693,549 | A | * | 9/1987 | Cheo ................................. 385/9 |
| 4,937,836 | A | * | 6/1990 | Yamamoto et al. ...... 372/46.012 |
| 5,153,930 | A | * | 10/1992 | DuPuy et al. ..................... 385/8 |

(Continued)

FOREIGN PATENT DOCUMENTS

| JP | 01302325 A | * | 12/1989 | ................ G02F 1/31 |
| JP | H01-302325 A | | 12/1989 | |

(Continued)

*Primary Examiner* — Peter Radkowski
(74) *Attorney, Agent, or Firm* — Taft Stettinius & Hollister LLP

(57) ABSTRACT

An object of the present invention is to provide an optical waveguide element that effectively diffuses charges accumulated in a substrate, and suppress DC drift or temperature drift. The optical waveguide element includes a substrate having an electro-optical effect, optical waveguides formed in the substrate, a buffer layer (BF layer) formed on the substrate, and modulation electrodes (signal electrode and ground electrode) that are formed on the buffer layer and modulate optical waves propagating through the optical waveguides, a charge diffusion layer that diffuses charges generated in the substrate is formed between the substrate and the buffer layer, and the charge diffusion layer is electrically connected with a ground electrode constituting the modulation electrode.

10 Claims, 4 Drawing Sheets

(56) References Cited

U.S. PATENT DOCUMENTS

| | | | |
|---|---|---|---|
| 5,388,170 A * | 2/1995 | Heismann et al. | 385/4 |
| 5,661,741 A * | 8/1997 | Kakimoto | 372/50.22 |
| 5,987,047 A * | 11/1999 | Valster et al. | 372/45.01 |
| 6,198,855 B1 * | 3/2001 | Hallemeier et al. | 385/2 |
| 6,885,780 B2 * | 4/2005 | Cheung et al. | 385/2 |
| 7,324,257 B2 * | 1/2008 | McBrien et al. | 359/245 |
| 7,408,693 B2 * | 8/2008 | Kissa et al. | 359/245 |
| 2004/0114845 A1 * | 6/2004 | Cheung et al. | 385/2 |
| 2006/0023288 A1 * | 2/2006 | McBrien et al. | 359/245 |
| 2008/0069491 A1 * | 3/2008 | Kissa et al. | 385/2 |
| 2008/0298736 A1 * | 12/2008 | Koenig et al. | 385/2 |

FOREIGN PATENT DOCUMENTS

| | | | | |
|---|---|---|---|---|
| JP | 06043503 A * | 2/1994 | | G02F 1/313 |
| JP | H06-043503 A | 2/1994 | | |
| JP | 2002-542511 A | 12/2002 | | |
| JP | 2003-075791 A | 3/2003 | | |
| JP | 2003075791 A * | 3/2003 | | G02F 1/035 |
| JP | 2005201732 A * | 7/2005 | | G01D 5/245 |
| JP | 2006-039569 A | 2/2006 | | |
| JP | 2006-201732 A | 8/2006 | | |
| JP | 2006-317550 A | 11/2006 | | |
| JP | 2006317550 A * | 11/2006 | | |
| JP | 2007-079249 A | 3/2007 | | |
| JP | 2007079249 A * | 3/2007 | | |

* cited by examiner

OPTICAL WAVEGUIDE ELEMENT

FIELD OF THE INVENTION

The present invention relates to an optical waveguide element, and particularly relates to an optical waveguide element having optical waveguides, a buffer layer, and modulation electrodes formed on a substrate having an electro-optical effect.

BACKGROUND ART

In the optical communication field or the optical measurement field, an optical waveguide element such as an optical intensity modulator having optical waveguides and modulation electrodes formed on a substrate having an electro-optical effect such as lithium niobate (LN) is being widely used.

In a substrate having an electro-optical effect, a so-called DC drift phenomenon in which the accumulation of charges generated by polarization or charges generated inside the substrate in response to an externally-applied electric field changes the driving voltage of an optical waveguide element occurs. In addition, a temperature drift phenomenon caused by the temperature change of the substrate also occurs.

Meanwhile, in forming the optical waveguides on the substrate and also disposing the modulation electrodes on the substrate, it is necessary to suppress the absorption and scattering of optical waves propagating through the optical waveguides by the modulation electrodes. Therefore, a buffer layer such as $SiO_2$ is disposed between the substrate having the optical waveguide formed thereon and the modulation electrodes.

Patent Literature No. 1 discloses the lamination of a first buffer layer, a conductive layer, a second buffer layer, and a center conductor disposed on a substrate in this order to suppress DC drift or temperature drift.

However, in a case in which a conductive film is formed on the surface of the buffer layer as a charge dispersion film, it becomes difficult to effectively disperse charges accumulated between the substrate and the buffer layer. Therefore, the accumulated charges have caused a problem of a change in the operating point of a product.

Patent Literature No. 1 also discloses that the conductive layer present between the first buffer layer and the second buffer layer is in contact with the substrate having an electro-optical effect. However, the conductive layer having the above-described structure has a graded structure, and thus is required to be produced in a so-called interaction portion region in which an electric field formed by the modulation electrodes acts on the optical waveguides.

Therefore, the production of the above-described graded structure to be homogeneous and the control of the respective film thicknesses of the first and second buffer layers and the conductive layer respectively lead to difficulties in the manufacturing process. In addition, the conductive layer having a graded structure which is present in the vicinity of the interaction portion region causes the variation in the characteristics of the obtained optical modulator.

CITATION LIST

Patent Literature

[Patent Literature No. 1] Japanese Laid-open Patent Publication No. 2006-317550

SUMMARY OF THE INVENTION

Technical Problem

The present invention solves the above-described problem, and provides an optical waveguide element that effectively diffuses charges accumulated in a substrate, and suppresses DC drift or temperature drift.

Solution to Problem

To solve the above-described problem, according to the invention in a first aspect, there is provided an optical waveguide element including a substrate having an electro-optical effect; optical waveguides formed in the substrate; a buffer layer formed on the substrate; and modulation electrodes that are formed on the buffer layer and modulate optical waves propagating through the optical waveguides, in which a charge diffusion layer that diffuses charges generated in the substrate is formed between the substrate and the buffer layer, and the charge diffusion layer is electrically connected with a ground electrode constituting the modulation electrode.

The invention in a second aspect is the optical waveguide element according to the first aspect, in which the charge diffusion layer is a conductive film or a semiconductor film.

The invention in a third aspect is the optical waveguide element according to the first or second aspect, in which the charge diffusion layer is constituted of a material having a lower refractive index than the optical waveguide.

The invention in a fourth aspect is the optical waveguide element according to the second or third aspect, in which a film thickness of the charge diffusion layer is in a range of 0.05 μm to 0.6 μm.

The invention in a fifth aspect is the optical waveguide element according to any one of the first to fourth aspects, in which electric connection between the charge diffusion layer and the ground electrode is constituted by any of a via connection penetrating through the buffer layer, a conductive film provided on a substrate-side surface, and a connection layer disposed by removing a part of the buffer layer.

The invention in a sixth aspect is the optical waveguide element according to the first aspect, in which the charge diffusion layer is constituted of a low-refractive index material having a lower refractive index than the optical waveguide and a semiconductor material, the charge diffusion layer made of the low-refractive index material is separately formed in at least a mutual action region with the optical waveguides under a signal electrode constituting the modulation electrode, a region including a vicinity thereof, a mutual action region with the optical waveguides under the ground electrode, and a region including a vicinity thereof, and the charge diffusion layer made of the semiconductor material electrically connects the charge diffusion layer made of the low-refractive index material under the signal electrode and the charge diffusion layer made of the low-refractive index material under the ground electrode.

The invention in a seventh aspect is the optical waveguide element according to the first aspect, in which the charge diffusion layer is made of a low-refractive index material having a lower refractive index than the optical waveguide, the charge diffusion layer made of the low-refractive index material includes regions having different film thicknesses and different resistances, regions in which a film thickness of the charge diffusion layer of the low-refractive index material is great and a resistance value is low are present in at least a mutual action region with the optical waveguides under a signal electrode constituting the modulation electrode, a region including a vicinity thereof, a mutual action region with the optical waveguides under the ground electrode, and a region including a vicinity thereof, a part of the charge diffusion layer under the signal electrode in which a film thickness is great and the resistance value is low and a part of the charge diffusion layer under the ground electrode in which a film thickness is great and the resistance value is low are mutually separately formed, and both charge diffusion layer parts are electrically connected with each other through a region in which the film thickness of the charge diffusion layer of the low-refractive index material is small and the resistance value is high.

The invention in an eighth aspect is the optical waveguide element according to the first aspect, in which the charge diffusion layer is made of a low-refractive index material having a lower refractive index than the optical waveguide, the charge diffusion layer made of the low-refractive index material is present in a mutual action region with the optical waveguides under a signal electrode constituting the modulation electrode, a region including a vicinity thereof, a mutual action region with the optical waveguides under the ground electrode, and a region including a vicinity thereof, a part of the charge diffusion layer under the signal electrode and a part of the charge diffusion layer under the ground electrode are mutually separately formed, and both charge diffusion layer parts are electrically connected with each other through a member having a higher resistance value than the charge diffusion layer.

Advantageous Effects of Invention

According to the invention in the first aspect, in the optical waveguide element including the substrate having an electro-optical effect; the optical waveguides formed in the substrate, the buffer layer formed on the substrate, and the modulation electrodes that are formed on the buffer layer and modulate optical waves propagating through the optical waveguides, the charge diffusion layer that diffuses charges generated in the substrate is formed between the substrate and the buffer layer, and the charge diffusion layer is electrically connected with a ground electrode constituting the modulation electrode, and therefore it becomes possible to provide an optical waveguide element in which charges generated in the substrate are efficiently diffused, and DC drift or temperature drift is suppressed. Particularly, since the charge diffusion layer is disposed so as to be in direct contact with the substrate, charges generated in the substrate can be efficiently dispersed, a charge diffusion function can be effectively generated by electrically connecting the charge diffusion layer and the ground electrode, and it becomes possible to maintain the charge diffusion effect for a long period of time.

According to the invention in the second aspect, the charge diffusion layer is a conductive film or a semiconductor film, and therefore it becomes possible to efficiently diffuse charges generated in the substrate.

According to the invention in the third aspect, the charge diffusion layer is constituted of a material having a lower refractive index than the optical waveguide, and therefore it becomes possible to suppress the loss of optical waves propagating through the optical waveguides even when the charge diffusion layer is formed right above the optical waveguides.

According to the invention in the fourth aspect, the film thickness of the charge diffusion layer is in a range of 0.05 μm to 0.6 μm, and therefore the charge diffusion layer can be formed in a continuous film, and can be constituted to be thinner than the thickness of the buffer layer. Then, the charge diffusion effect is maintained, and there are no cases in which a disadvantage such as an increase in the driving voltage occurs by the presence of the charge diffusion layer increasing the distance between the substrate and the modulation electrodes.

According to the invention in the fifth aspect, the electric connection between the charge diffusion layer and the ground electrode is constituted by any of a via connection penetrating through the buffer layer, a conductive film provided on a substrate-side surface, and a connection layer disposed by removing a part of the buffer layer, and therefore it becomes possible to electrically connect the charge diffusion layer and the ground electrode in a more reliable manner.

According to the invention in the sixth aspect, the charge diffusion layer is constituted of a low-refractive index material having a lower refractive index than the optical waveguide and a semiconductor material, the charge diffusion layer made of the low-refractive index material is separately formed in at least a mutual action region with the optical waveguides under a signal electrode constituting the modulation electrode, a region including a vicinity thereof, a mutual action region with the optical waveguides under the ground electrode, and a region including a vicinity thereof, and the charge diffusion layer made of the semiconductor material electrically connects the charge diffusion layer made of the low-refractive index material under the signal electrode and the charge diffusion layer made of the low-refractive index material under the ground electrode, and therefore it becomes possible to effectively apply an electric field to the optical waveguides even in a case in which the charge diffusion layer is provided under the signal electrode and the ground electrode.

According to the invention in the seventh aspect, the charge diffusion layer is made of a low-refractive index material having a lower refractive index than the optical waveguide, the charge diffusion layer made of the low-refractive index material includes regions having different film thicknesses and different resistances, regions in which a film thickness of the charge diffusion layer of the low-refractive index material is great and a resistance value is low are present in at least a mutual action region with the optical waveguides under a signal electrode constituting the modulation electrode, a region including a vicinity thereof, a mutual action region with the optical waveguides under the ground electrode, and a region including a vicinity thereof, a part of the charge diffusion layer under the signal electrode in which a film thickness is great and the resistance value is low and a part of the charge diffusion layer under the ground electrode in which a film thickness is great and the resistance value is low are mutually separately formed, and both charge diffusion layer parts are electrically connected with each other through a region in which the film thickness of the charge diffusion layer of the low-refractive index material is small and the resistance value is high, and therefore it becomes possible to effectively apply an electric field to the optical waveguides even in a case in which the charge diffusion layer is provided under the signal electrode and the ground electrode.

According to the invention in the eighth aspect, the charge diffusion layer is made of a low-refractive index material having a lower refractive index than the optical waveguide, the charge diffusion layer made of the low-refractive index material is present in a mutual action region with the optical waveguides under a signal electrode constituting the modulation electrode, a region including a vicinity thereof, a mutual action region with the optical waveguides under the ground electrode, and a region including a vicinity thereof, a part of the charge diffusion layer under the signal electrode and a part of the charge diffusion layer under ground electrode are mutually separately formed, and both charge diffusion layer parts are electrically connected with each other through a member having a higher resistance value than the charge diffusion layer, and therefore it becomes possible to effectively apply an electric field to the optical waveguides even in a case in which the charge diffusion layer is provided under the signal electrode and the ground electrode.

DETAILED DESCRIPTION OF THE INVENTION

Hereinafter, an optical waveguide element of the present invention will be described in detail.

Figure 1:
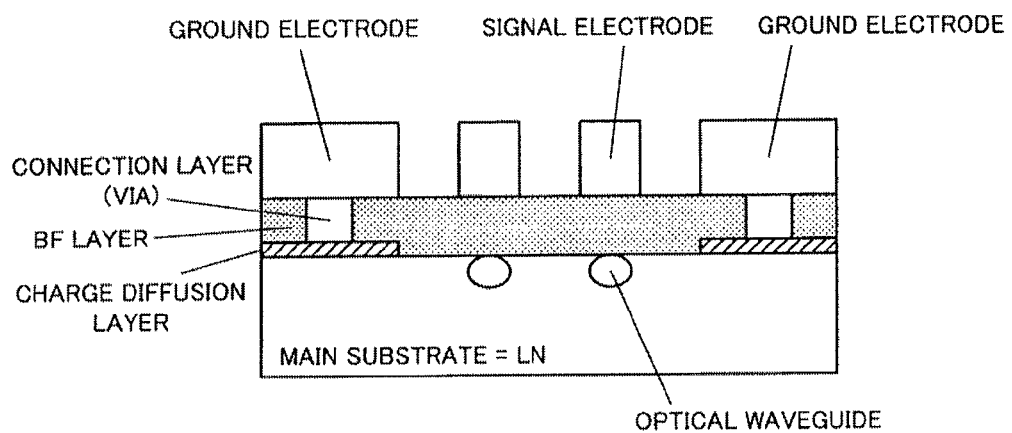
FIG. 1 is a cross-sectional view illustrating an optical waveguide element of the present invention, and illustrates an example in which electrical connection is carried out through a via connection.

As illustrated in FIG. 1, the optical waveguide element of the present invention is an optical waveguide element including a substrate having an electro-optical effect, optical waveguides formed in the substrate, a buffer layer (BF layer) formed on the substrate, and modulation electrodes (signal electrode and ground electrode) that are formed on the buffer layer and modulate optical waves propagating through the optical waveguides, in which a charge diffusion layer that diffuses charges generated in the substrate is formed between the substrate and the buffer layer, and the charge diffusion layer is electrically connected with a ground electrode constituting the modulation electrode.

As the substrate used in the present invention, a substrate for which a material having an electro-optical effect can be used, and, for example, a substrate made of lithium niobate, lithium tantalate, polarized lead zirconium titanate (PLZT), a silica-based material, or a combination of the above-described materials can be used. Particularly, a lithium niobate (LN) crystal having a strong electro-optical effect is preferably used.

Regarding the method for forming the optical waveguides in the substrate, the optical waveguides can be formed by diffusing Ti or the like into the substrate surface in a thermal diffusion method, a proton exchange method, or the like. In addition, it is also possible to use ridge-shaped waveguides obtained by forming portions of the substrate corresponding to the optical waveguides in a protrusion shape by etching the substrate areas other than the optical waveguides or forming grooves on both sides of the optical waveguides.

In the optical waveguide element, the modulation electrodes such as the signal electrode and the ground electrode are formed on the top side of the substrate. These electrodes can be formed by forming an electrode pattern of Au and using a gold plating method or the like.

The buffer layer (BF layer) is formed between the optical waveguides and the modulation electrodes. The buffer layer is formed using a sputtering method or the like using an insulating material having a lower refractive index than the optical waveguide of $SiO_2$ or the like. The thickness of the buffer layer is preferably set in a range of 500 nm to 1000 nm, and particularly preferably to approximately 600 nm in consideration of conditions in which the absorption of optical waves by the electrodes is suppressed, and an electric field formed by the electrodes is effectively applied to the optical waveguides.

A feature of the present invention is that the charge diffusion layer is provided so as to be in direction contact with the substrate, and thus is electrically connected with the ground electrode. As the charge diffusion layer, a conductive film such as Au, Ag, Ti, Al or indium tin oxide (ITO) or a semiconductor film such as Si is used. The charge diffusion layer is formed using a vacuum film-forming method such as a sputtering method, a deposition method, or a CVD method, or by attaching a thinned conductive layer.

The charge diffusion layer is formed on the substrate except for the vicinities of the optical waveguides as illustrated in FIG. 1 by combining patterning in photolithography and dry etching or chemical etching. The interval between the optical waveguide and the charge diffusion layer is preferably equal to or greater than the interval between the signal electrode and the ground electrode, for example, 25 µm or more.

However, in a case in which a material having a lower refractive index than the optical waveguide such as ITO is used for the charge diffusion layer, it is possible to suppress the loss of optical waves propagating through the optical waveguides even when the charge diffusion layer is formed right above the optical waveguides formed in the substrate.

The film thickness of the charge diffusion layer is preferably set in a range of 0.05 µm to 0.6 µm. Then, it is possible to form the charge diffusion layer in a form of a continuous film and constitute the charge diffusion layer to be thinner than the thickness of the buffer layer. Then, the charge diffusion layer is capable of maintaining the characteristics such as conductivity and exhibiting the charge diffusion effect.

The charge diffusion layer of the present invention enables the provision of an optical waveguide element that effectively diffuses charges generated in the substrate and suppresses DC drift or temperature drift. Particularly, since the charge diffusion layer is disposed so as to be in direct contact with the substrate, it is possible to efficiently diffuse charges generated in the substrate, effectively generate the charge diffusion function by electrically connecting the charge diffusion layer with the ground electrode, and maintain the charge diffusion effect for a long period of time.

The electric connection between the charge diffusion layer and the ground electrode can be constituted using a via connection penetrating the buffer layer as illustrated in FIG. 1. As the type of films used for the via connection, conductive materials such as Au, Ag, Ti, Al, and ITO are preferably used.

Figure 2:
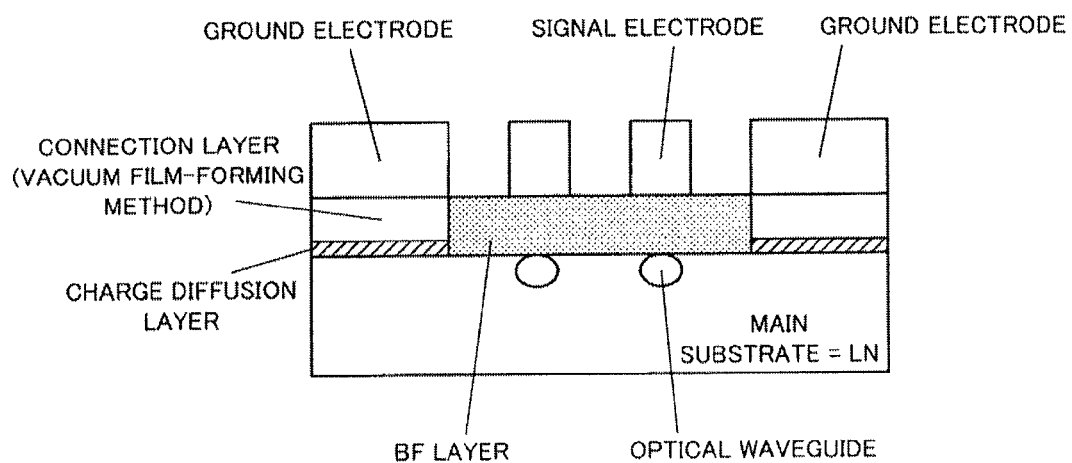
FIG. 2 is a cross-sectional view illustrating the optical waveguide element of the present invention, and illustrates an example in which electrical connection is carried out by using a connection layer.
Figure 3:
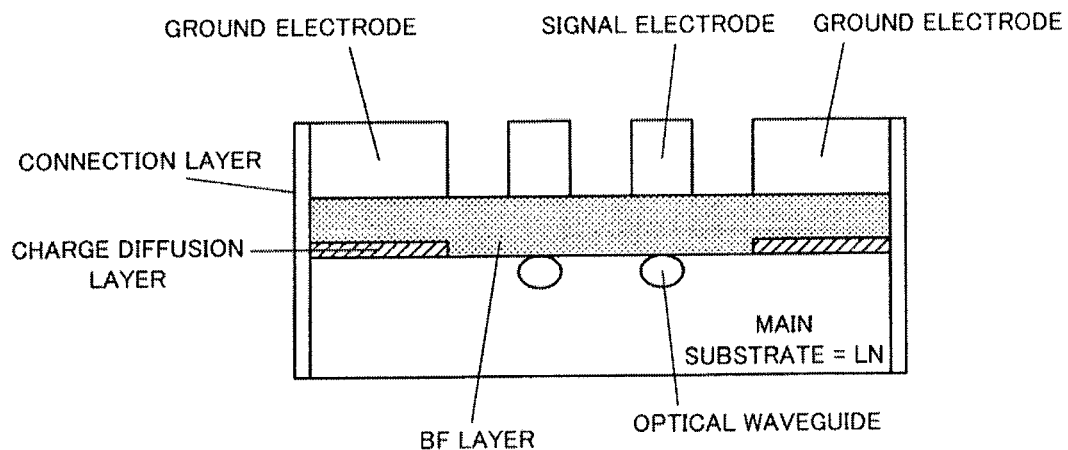
FIG. 3 is a cross-sectional view illustrating the optical waveguide element of the present invention, and illustrates an example in which electrical connection is carried out by using a conductive film provided on a substrate side surface.

As other electric connection methods, there is a method in which all or part of the buffer layer that is formed on the charge diffusion layer and is disposed right below the ground electrode is removed through dry etching or chemical etching, and connection layers are formed in the removed portions by using a vacuum film-forming method such as a sputtering method, a deposition method, and a CVD method as illustrated in FIG. 2. In addition, it is also possible to dispose the connection layers on side surfaces of the substrate as illustrated in FIG. 3.

Figure 4:
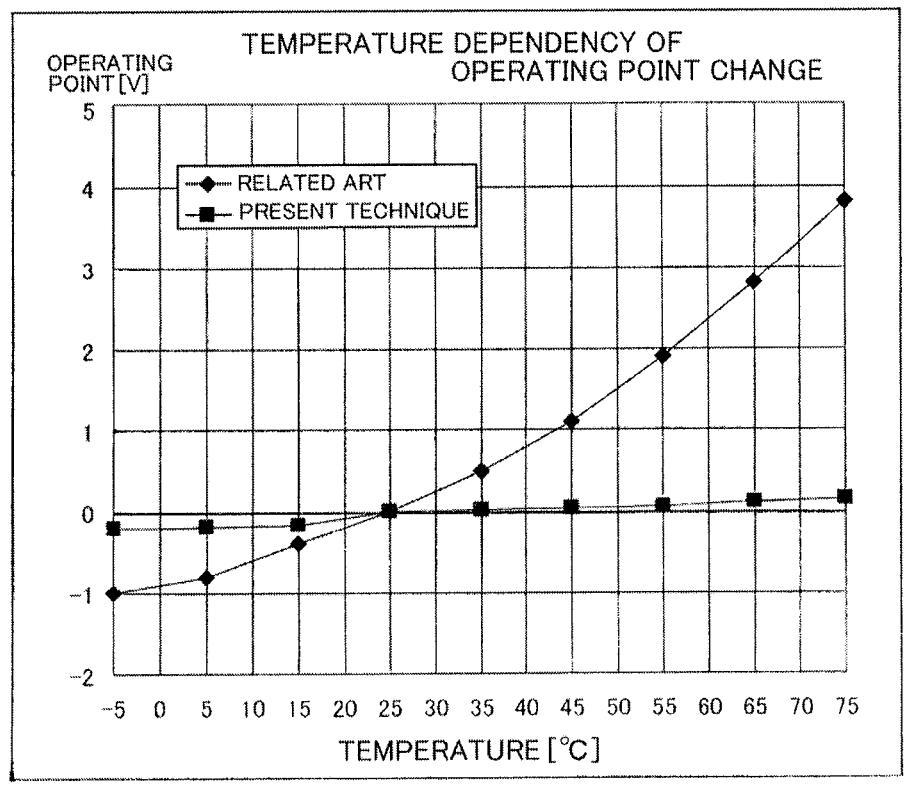
FIG. 4 is a graph comparing the present invention and the related art in terms of the temperature dependency of an operating point change.

FIG. 4 is a graph comparing the temperature dependencies of an operating point change between the optical waveguide element (FIG. 1) of the present invention and the related art (a case in which there is no charge diffusion layer and no via connection of FIG. 1). It is understood that, in the optical waveguide element of the present invention, the bias point only slightly changes with respect to the temperature change, and the influence of the generation of charges in the substrate, which is the cause of the bias change, can be effectively removed.

In a case in which a low-refractive index material having a lower refractive index than the optical waveguide such as ITO is used for the charge diffusion layer, it is also possible to cover the entire surface of the substrate with the charge diffusion layer.

However, in a case in which the charge diffusion layer is formed on the entire surface, it is necessary to avoid "electric short circuit" or "an extreme decrease in the resistance value" between a mutual action region with the optical waveguides under the signal electrode and a region including a vicinity thereof, and a mutual action region with the optical waveguides under the ground electrode and a region including a vicinity thereof. Meanwhile, the mutual action region in the present invention refers to a portion in which the electric field formed by the modulation electrodes (the signal electrode and the ground electrode) is applied to the optical waveguides.

As a measure therefor, it is necessary to provide a region having a high resistance value between two regions of the charge diffusion layer. Specifically, a structure in which the charge diffusion layer made of the low-refractive index material provides a region having a thinned film thickness in some parts between "the region of the interaction portion under the signal electrode including a vicinity thereof" and "the region of the interaction portion under the ground electrode including a vicinity thereof", thereby having an electrical resistance value, or a structure in which a part of the charge diffusion layer made of the low-refractive index material in "the region of the interaction portion under the signal electrode including a vicinity thereof" and a part of the charge diffusion layer made of the low-refractive index material in "the region of the interaction portion under the ground electrode including a vicinity thereof" are separated, thereby providing an electrical resistance between the respective charge diffusion layer parts can be considered.

In this case, the parts of the charge diffusion layer made of the low-refractive index material are preferably connected through a layer for which a semiconductor material such as Si is used. In addition, it is also possible to use a member having a higher electrical resistance value than the charge diffusion layer.

Figure 5:
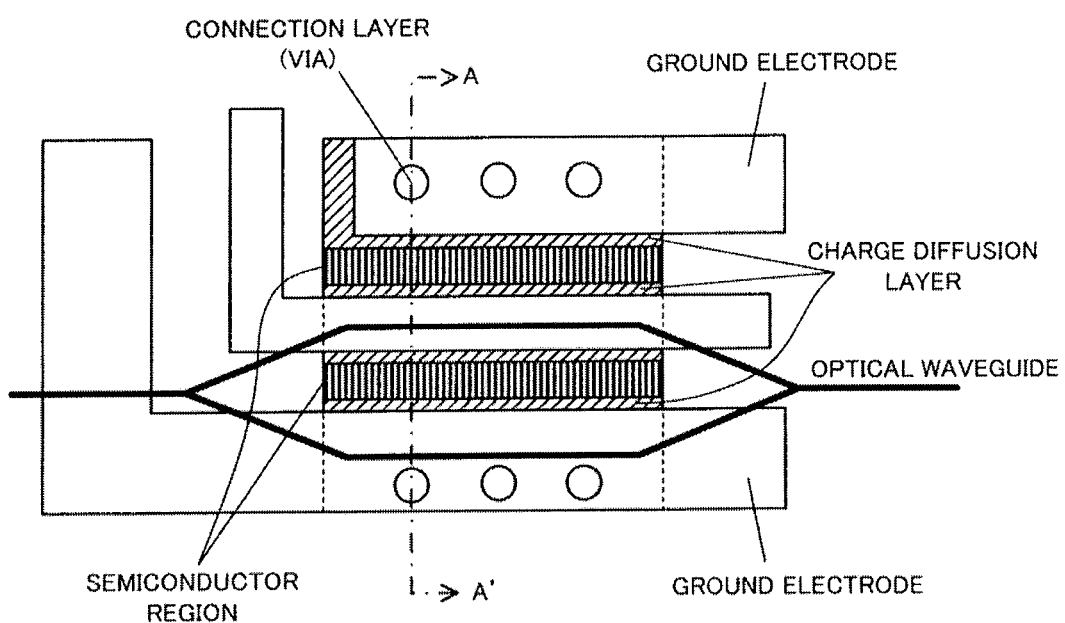
FIG. 5 is a plan view illustrating the optical waveguide element of the present invention, and is a view illustrating an example in which parts of a charge diffusion layer made of a low-refractive index material are disposed along optical waveguides, and are connected with a ground electrode through a via connection.

FIG. 5 illustrates a plan view of an embodiment in which the low-refractive index material having a lower refractive index than the optical waveguide such as ITO and the semiconductor material are used for the charge diffusion layer, and the charge diffusion layer and the ground electrode are connected with each other through the via connection.

Figure 6:
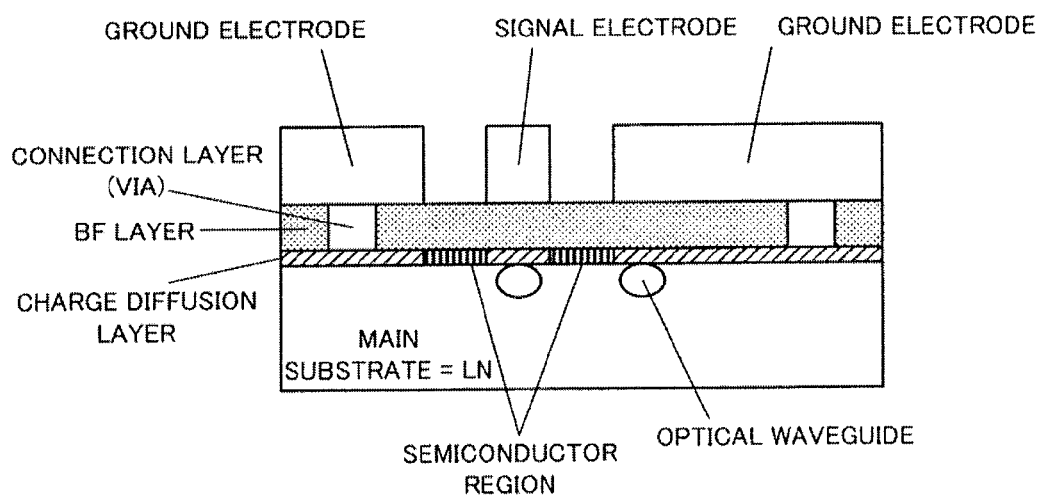
FIG. 6 is a cross-sectional view in the direction of the dotted line A-A' in FIG. 5, and illustrates an example in which the charge diffusion layer made of the low-refractive index material is formed in a region including areas right above the optical waveguides on the substrate surface, and is connected with the ground electrode through the via connection.

FIG. 6 is a cross-sectional view in the direction of the dotted line A-A' in FIG. 5. The optical waveguide element is constituted so that the charge diffusion layer made of the low-refractive index material is provided in the mutual action region with the optical waveguides under the signal electrode, the region including the vicinity thereof, the mutual action region with the optical waveguides under the ground electrode, and the region including the vicinity thereof in which it is necessary to eliminate the influence of the charge accumulation in the substrate, the charge diffusion layer made of the semiconductor material is provided between an area below the signal electrode and an area below the ground electrode, and the charge diffusion layer and the ground electrode are electrically connected with each other in a place in which there is no signal electrode or optical waveguide.

Figure 7:
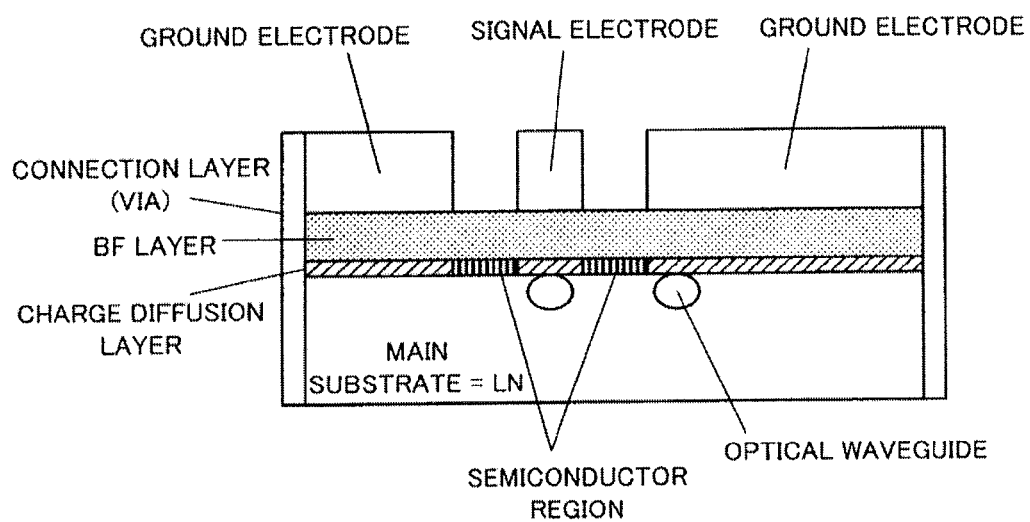
FIG. 7 illustrates an example in which the connection layer is used instead of the via connection in the constitution of FIG. 6.

FIG. 7 illustrates an embodiment in which the connection layer is used instead of the via connection in the embodiment illustrated in FIG. 5.

Instead of the semiconductor region of the charge diffusion layer in the embodiments illustrated in FIGS. 5 to 7, a charge diffusion layer made of a low-refractive index material having a decreased film thickness and an increased resistance value or a member (film body) having a higher electrical resistance value than a charge layer can be used.

INDUSTRIAL APPLICABILITY

As described above, according to the present invention, it becomes possible to provide an optical waveguide element that effectively diffuses charges accumulated in a substrate, and suppress DC drift or temperature drift.

The invention claimed is:
1. An optical waveguide element comprising:
   a substrate having an electro-optical effect;
   optical waveguides formed in the substrate;
   a buffer layer formed on the substrate; and
   modulation electrodes comprising a signal electrode and a ground electrode that are formed on the buffer layer and that modulate optical waves propagating through the optical waveguides,
   wherein a charge diffusion layer that diffuses charges generated in the substrate is formed between the substrate and the buffer layer,
   the charge diffusion layer is comprised of low-refractive index material having a lower refractive index than a refractive index of the optical waveguide,
   a part of the charge diffusion layer is under the signal electrode and a part of the charge diffusion layer is under the ground electrode separately at least in a mutual action region in which an electric field formed by the modulation electrodes is applied to the optical waveguides,
   the part of the charge diffusion layer under the ground electrode is electrically connected with the ground electrode,
   the part of the charge diffusion layer under the signal electrode and the part of the charge diffusion layer under the ground electrode are electrically connected with each other through a member having a higher resistance value than the charge diffusion layer.
2. The optical waveguide element according to claim 1, wherein the member having the higher resistance value is comprised of a semiconductor material.

3. The optical waveguide element according to claim 1,
wherein the member having the higher resistance value is comprised of low-refractive index material that is the same as the material of the charge diffusion layer under the signal electrode and of the charge diffusion layer under the ground electrode, and
a film thickness of the member is thinner than a film thickness of the charge diffusion layer under the signal electrode and of the charge diffusion layer under the ground electrode.

4. The optical waveguide element according to claim 1,
wherein the charge diffusion layer is a conductive film or a semiconductor film.

5. The optical waveguide element according claim 2,
wherein the charge diffusion layer is a conductive film or a semiconductor film.

6. The optical waveguide element according to claim 3,
wherein the charge diffusion layer is a conductive film or a semiconductor film.

7. The optical waveguide element according to claim 4,
wherein a film thickness of the charge diffusion layer is in a range of 0.05 µm to 0.6 µm.

8. The optical waveguide element according to claim 5,
wherein a film thickness of the charge diffusion layer is in a range of 0.05 µm to 0.6 µm.

9. The optical waveguide element according to claim 6,
wherein a film thickness of the charge diffusion layer is in a range of 0.05 µm to 0.6 µm.

10. The optical waveguide element according to any one of claims 1 to 9,
wherein electric connection between the charge diffusion layer and the ground electrode is constituted by any of a via connection penetrating through the buffer layer, a conductive film provided on a substrate-side surface, and a connection layer disposed by removing a part of the buffer layer between the ground electrode and the charge diffusion layer under the ground electrode.

* * * * *